(12) United States Patent
Lesieur

(10) Patent No.: US 6,596,039 B1
(45) Date of Patent: Jul. 22, 2003

(54) COMPACT FUEL GAS REFORMER ASSEMBLAGE WITH BURNER WALL TEMPERATURE CONTROL

(75) Inventor: Roger R. Lesieur, Enfield, CT (US)

(73) Assignee: UTC Fuel Cells, LLC, So. Windsor, CT (US)

( * ) Notice: Subject to any disclaimer, the term of this patent is extended or adjusted under 35 U.S.C. 154(b) by 265 days.

(21) Appl. No.: 09/368,455

(22) Filed: Jun. 30, 1999

(51) Int. Cl.$^7$ .................................................. C01B 3/26
(52) U.S. Cl. ........................ 48/61; 48/94; 48/127.7; 48/198.8; 422/191; 422/203; 422/205
(58) Field of Search ................ 48/61, 94, 127.7, 48/198.8; 165/146, 166; 422/191, 203, 205

(56) References Cited

U.S. PATENT DOCUMENTS

| | | | | |
|---|---|---|---|---|
| 2,344,588 A | * | 3/1944 | Blauvelt | 165/146 |
| 3,631,819 A | * | 1/1972 | Houchman | 432/128 |
| 4,049,051 A | * | 9/1977 | Parker | 165/166 |
| 4,623,019 A | * | 11/1986 | Wiard | 165/146 |
| 4,917,173 A | * | 4/1990 | Brown et al. | 165/274 |
| 5,733,347 A | * | 3/1998 | Lesieur | 48/61 |
| 5,818,694 A | * | 10/1998 | Daikoku et al. | 361/703 |

* cited by examiner

Primary Examiner—Jerry D. Johnson
Assistant Examiner—Basia Ridley
(74) Attorney, Agent, or Firm—William W. Jones

(57) ABSTRACT

A fuel gas reformer assemblage for use in a fuel cell power plant is formed from a composite plate assembly which includes spaced-apart divider plates with interposed columns of individual gas passages. The reformer assemblage is constructed from a series of repeating sub-assemblies, each of which includes a core of separate regenerator/heat exchanger gas passages. The core in each sub-assembly is sandwiched between a pair of reformer gas passage skins, which complete the sub-assembly. Adjacent reformer gas/regenerator/reformer gas passage sub-assemblies in the composite plate assembly are separated from each other by burner gas passages. The burner gas stream and the process gas stream flow in opposite directions through the assemblage. A varying heat transfer fin density population is disposed in the burner gas passage so as to control the peak burner wall temperatures encountered during operation of the assemblage. The burner wall peak temperature is preferably no greater than about 1,700° F., and is preferably within about 100° F. of the peak process gas temperature.

14 Claims, 3 Drawing Sheets

COMPACT FUEL GAS REFORMER ASSEMBLAGE WITH BURNER WALL TEMPERATURE CONTROL

TECHNICAL FIELD

This invention relates to a fuel gas steam reformer assemblage which is formed from a plurality of repeating subassemblies. More particularly, this invention relates to a fuel gas steam reformer assemblage which is compact and lighter in weight than conventional steam reformer assemblages used in fuel cell power plants and which operates at lower burner gas passage wall temperatures.

BACKGROUND

Fuel cell power plants include fuel gas steam reformers which are operable to catalytically convert a fuel gas, such as natural gas, into a gas stream containing primarily hydrogen and carbon dioxide. The conversion involves passing a mixture of the fuel gas and steam through a catalytic bed which is heated to a reforming temperature of about 900° F. to about 1,600° F. The difference between the bulk reactant gas and the reactor walls can be as much as 400° F. to 500° F. Catalysts typically used are nickel catalysts which are deposited on alumina pellets. A typical reformer will consist of a plurality of reaction tubes which are contained in a housing that is insulated for heat retention. The reaction tubes are heated by burning excess fuel gas in the housing and passing the burner gasses over the reaction tubes. The individual reaction tubes will typically include a central exhaust passage surrounded by an annular entry passage. The entry passage is filled with the catalyzed alumina pellets, and a fuel gas-steam manifold is operable to deliver the fuel gas-steam mixture to the bottom of each of the entry passages whereupon the fuel gas-steam mixture flows through the catalyst beds. The resultant heated hydrogen-rich gas stream then flows through the central exhaust passages in each tube so as to assist in heating the inner portions of each of the annular catalyst beds; and thence from the reformer for further processing and utilization.

Steam reformers require a large amount of surface area in the catalyst bed in order to provide a high degree of catalyst-fuel mixture interaction and a large heat transfer surface area to produce the amount of hydrogen required to operate the fuel cells at peak efficiency. This need for large catalyst bed and heat transfer surface area, when met by using catalyst-coated pellets in tubular reformers, results in undesirably large and heavy reformer assemblies. For example, a commercially available 200 KW acid fuel cell power plant includes a steam reformer component which has a volume of about 150 to 175 cubic feet; and weighs about 3,500 lbs. It would be highly desirable to provide a steam reformer which is suitable for use in a fuel cell power plant, which reformer supplies the necessary surface areas, but is compact and light in weight.

U.S. Pat. No. 5,733,347 granted Mar. 31, 1998 to R. R. Lesieur describes a compact light weight fuel gas reformer which has adjacent burner gas and fuel gas passages. The burner and fuel gas passages both contain heat transfer fins which extend for the entire length of the passages. When the structure shown in the aforesaid patent is operated at 1,500° F. + temperatures with its counter flow arrangement of burner gas and process gas, undesirably high burner passage wall temperatures may occur due to high heat transfer through the fins toward the front and middle portions of the burner gas passages, which high heat transfer is not offset by a high rate of heat absorption in the process gas stream. The wall temperatures will drop after the middle of the burner gas passages because of the higher heat absorption by the incoming process gas, however the excessive heat produced may damage the reformer walls.

It would be desirable to provide a compact, light weight reformer assemblage such as that shown in the aforesaid patent, but which would not be subjected to the over heating problem described above.

DISCLOSURE OF THE INVENTION

This invention relates to a steam reformer structure which provides the necessary catalyzed and heat transfer surface area, is substantially smaller and lighter than conventional steam reformers, and can be operated at lower wall temperatures. The steam reformer structure of this invention is formed from a series of essentially flat plate reformer components. Each of the reformer components includes outer reformer passages sandwiched around a plurality of central regenerator/heat exchanger passages.

The basic configuration of the catalyzed reformer consists of repeating modules of burner-reformer-regenerator-reformer-burner elements. Gases in the burner and regenerator sections flow in one direction, and the fuel gases flow through the reformer passages in the opposite direction. This is a desirable configuration of a reformer where the reformed gas passes counter flow to the reformer reactant stream so that it can transfer its heat to the reactant stream.

Heat is generated by the combustion of burner gases as they pass through the burner cavity and burn catalytically on the burner walls. The reforming reaction is very endothermic and because of the dynamic equilibrium also requires high temperatures to achieve high conversion. With a high catalytic surface area in the burner, the burner gas combustion would take place at the top of the reactor. However, at this location, most of the reforming has already taken place, so there would be insufficient cooling from the reformer endothermic reaction to keep the walls' temperature within a reasonable range, i.e., below about 1,600° F. To maintain wall temperature within the acceptable range at the inlet end of the burner gas passages, heat transfer fins are eliminated in this section. The system configuration which eliminates high burner wall temperatures consists of an inlet section having no heat transfer fins; and intermediate section having a low density of heat transfer fins; and an outlet section having a higher density of heat transfer fins. By fin "density", I am referring to the number of fins per inch of burner passage taken in the direction which is transverse to the direction of burner gas flow. The wall temperature will still spike, but it will be maintained at levels which are lower than 1,600° F. All other metal temperatures are less than 1,500° F. It is noted that with a proper system configuration, the temperature can be manipulated so that the walls remain relatively cool for longer useful life. A high fin density is maintained throughout the entirety of both the reformer and the regenerator passages so as to force the reformer gas to come very close to the reformer wall temperatures, hence providing fuel conversion on the reformer side and low regenerator (process) exit temperatures.

Based on the reformer model, a conceptual design of a 200 kW. reformer (7,000 ft$^3$ of H$_2$/hr) was made. It consisted of ten elements with each element having a burner, two reformer sections and a regenerator section. The burner gas was vented to the bottom of the reformer, the process gas exhaust to the left, and the process gas inlet to the right. This type of configuration simplifies all of the manifolding. The total thickness of each element was about 1.5 inches. Axial waviness of the fins adds to the strength of the elements as well as increasing the surface area and heat transfer characteristics by enhancing gas flow turbulence. The first 40% of the burner gas passages was devoid of heat transfer fins; the next 10% of the burner gas passages was provided with a low density fin structure, i.,e., approximately one fin per inch; and the remaining 50% of the burner gas passages was provided with a higher density fin structure, i.,e., approximately ten fins per inch.

Using the aforesaid fin density arrangement, peak reformer gas temperatures of about 1,500° F. were obtained, while peak burner wall temperatures were kept at about 1,600° F. This compares with comparable reformer gas temperatures achieved with the prior art structure and burner gas passage wall temperatures of above 1,700° F.

It is therefore an object of this invention to provide an improved fuel gas steam reformer assembly for use in a fuel cell power plant.

It is a further object of this invention to provide a reformer assembly of the character described which has a longer useful life due to temperature control of burner gas passage walls of the assembly.

It is another object of this invention to provide a reformer assembly of the character described wherein the highest wall temperature experienced in the assembly is less than about 1,600° F.

It is yet another object of this invention to provide a reformer assembly of the character described which employs serpentine gas flow and heat transfer fins in the gas passages, which fins vary in population density in different areas of the assembly.

BRIEF DESCRIPTION OF THE DRAWINGS

These and other objects and advantages of this invention will become readily apparent to one skilled in the art from the following detailed description of a preferred embodiment of the invention when taken in conjunction with the accompanying drawings in which.

SPECIFIC MODE FOR CARRYING OUT THE INVENTION

Figure 1:
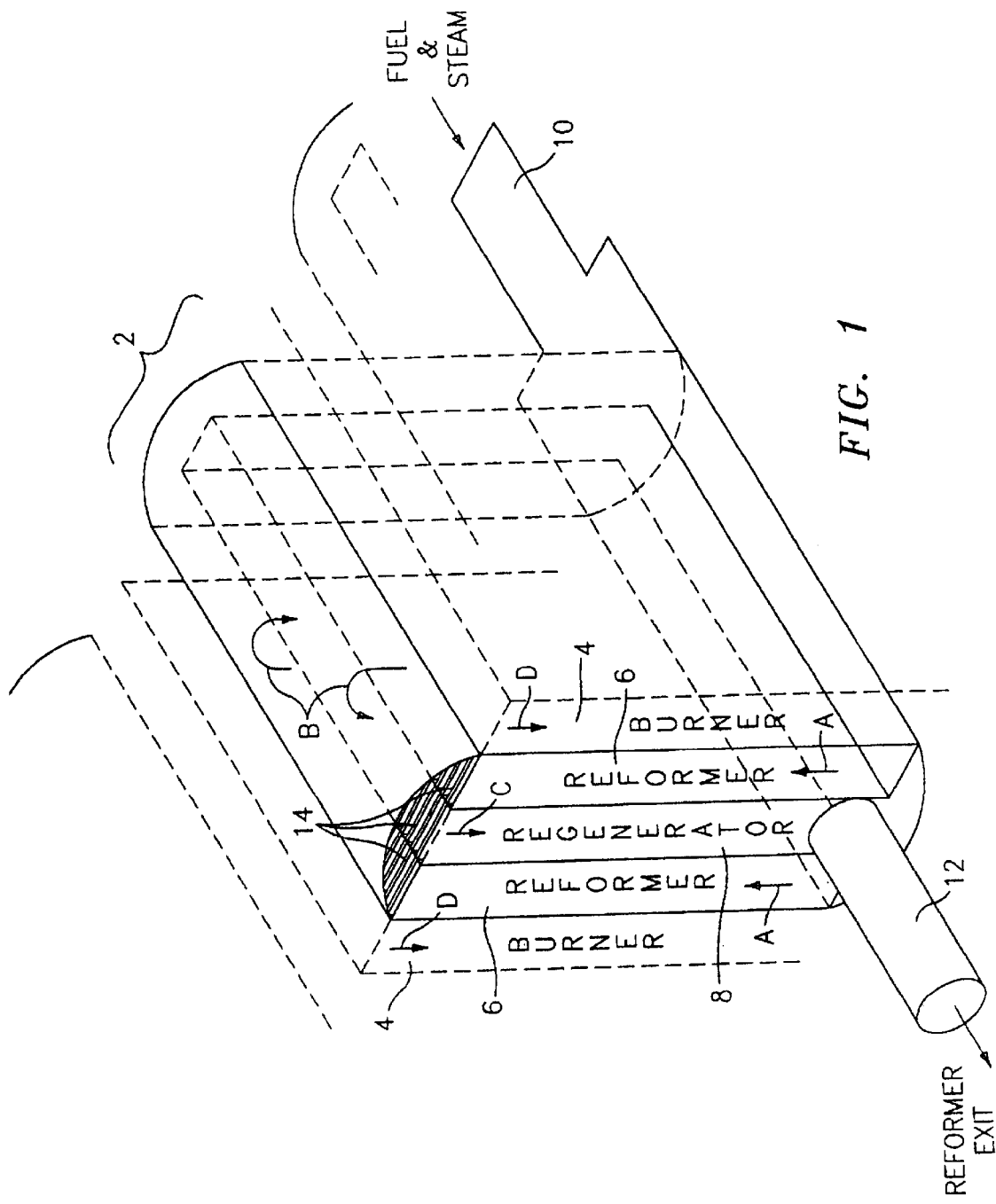
FIG. 1 is a schematic, fragmented perspective view of a single reformer unit component of a reformer assembly formed in accordance with this invention.

Referring now to the drawings, FIG. 1 shows one embodiment of a fuel gas/steam reformer module, denoted generally by the numeral 2, which is formed in accordance with this invention. The module 2 includes outermost burner gas flow passages 4; inner medial reformer gas passages 6; and an innermost fuel gas regenerator passage 8. The fuel and steam gas mixture enters the module 2 through entrance manifold 10 and flows into the reformer gas passages 6 as indicated by the arrows A. The burner gas enters the burner gas passages 4 in a counter flow direction relative to the fuel gas/steam mixture flow direction, as indicated by the arrows D. The reformed fuel gas/steam mixture exits the reformer gas passages 6 and then reverses its direction of flow, as indicated by the arrows B, and flows into the regenerator section 8 of the assemblage 2 as indicated by the arrows C. The reformed fuel gas then exits the assembly 2 via the gas passage 12. It will be noted that the reformer passages 6 and the regenerator passage 8 all contain heat transfer fins 14 which extend for the entire length of the passages 6 and 8. It is also noted that the entrance ends of the burner passages 4 are not provided with the heat transfer fins 14.

Figure 2:
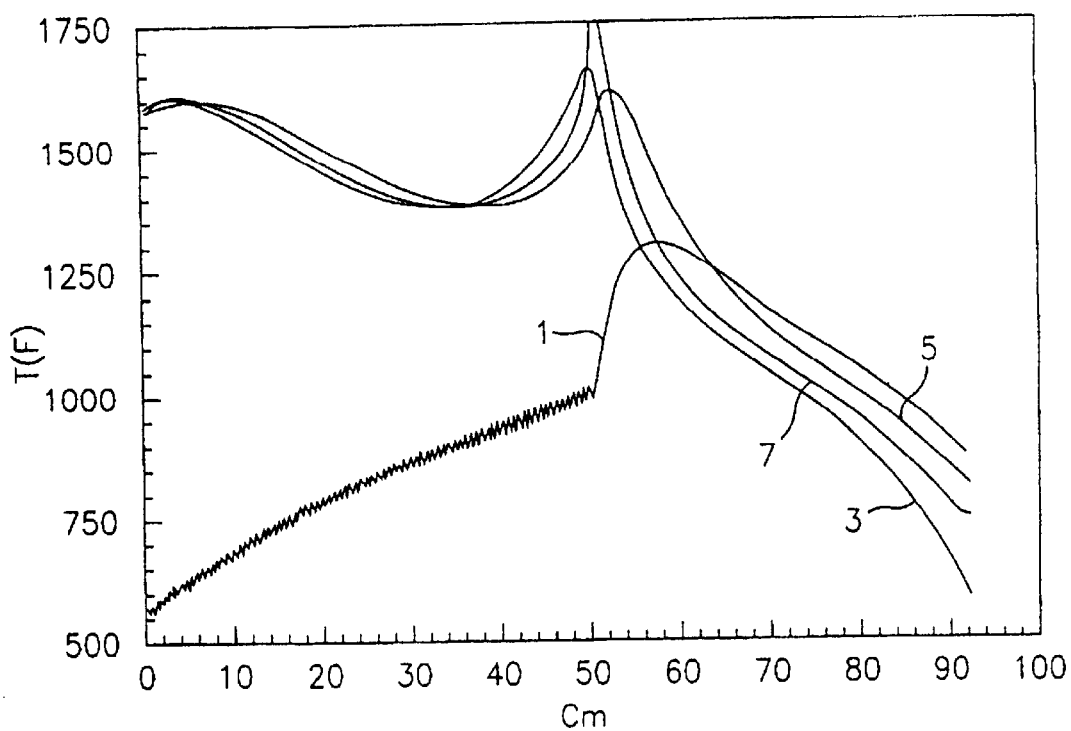
FIG. 2 is a gas flow and wall temperature profile of a reformer assembly which is not equipped with the modified heat transfer fin structure of this invention.

In the system described in U.S. Pat. No. 5,733,347 referred to above, the burner gas passages, the reformer passages, and the regenerator passages are all provided with heat transfer fins for their entire lengths. FIG. 2 is a plot of the temperatures of various components in the reformer assembly, the Y axis being degrees Fahrenheit, and the X axis being the distance in centimeters from the entrance of the burner gas passages to the exit of the burner gas passages when the structure shown in the '347 patent is used to reform a fuel gas stream and the burner gas flow and fuel gas flow are counter to each other. The trace 1 is a trace of the temperature of the burner gases; trace 3 is a trace of the temperature of the reformer gases; trace 5 is a trace of the temperature of the regenerator gases; and trace 7 is a trace of the temperature of the walls of the burner gas passages. This figure illustrates the temperatures which are created when the structure of the '347 patent is used in the reformer. All of the temperatures achieved by the '347 patent reformer structure, except for the burner passage wall temperatures, are acceptable. Thus, the reformer structure which includes the heat transfer fins which extend throughout the entirety of all of the gas passages in the reformer assembly results in undesirably high burner gas passage wall temperatures which exceed 1,750° F. Burner gas passage wall temperatures of this magnitude can drastically shorten the useful life of the reformer, and can actually melt the walls of the burner passages during prolonged periods of use.

Figure 3:
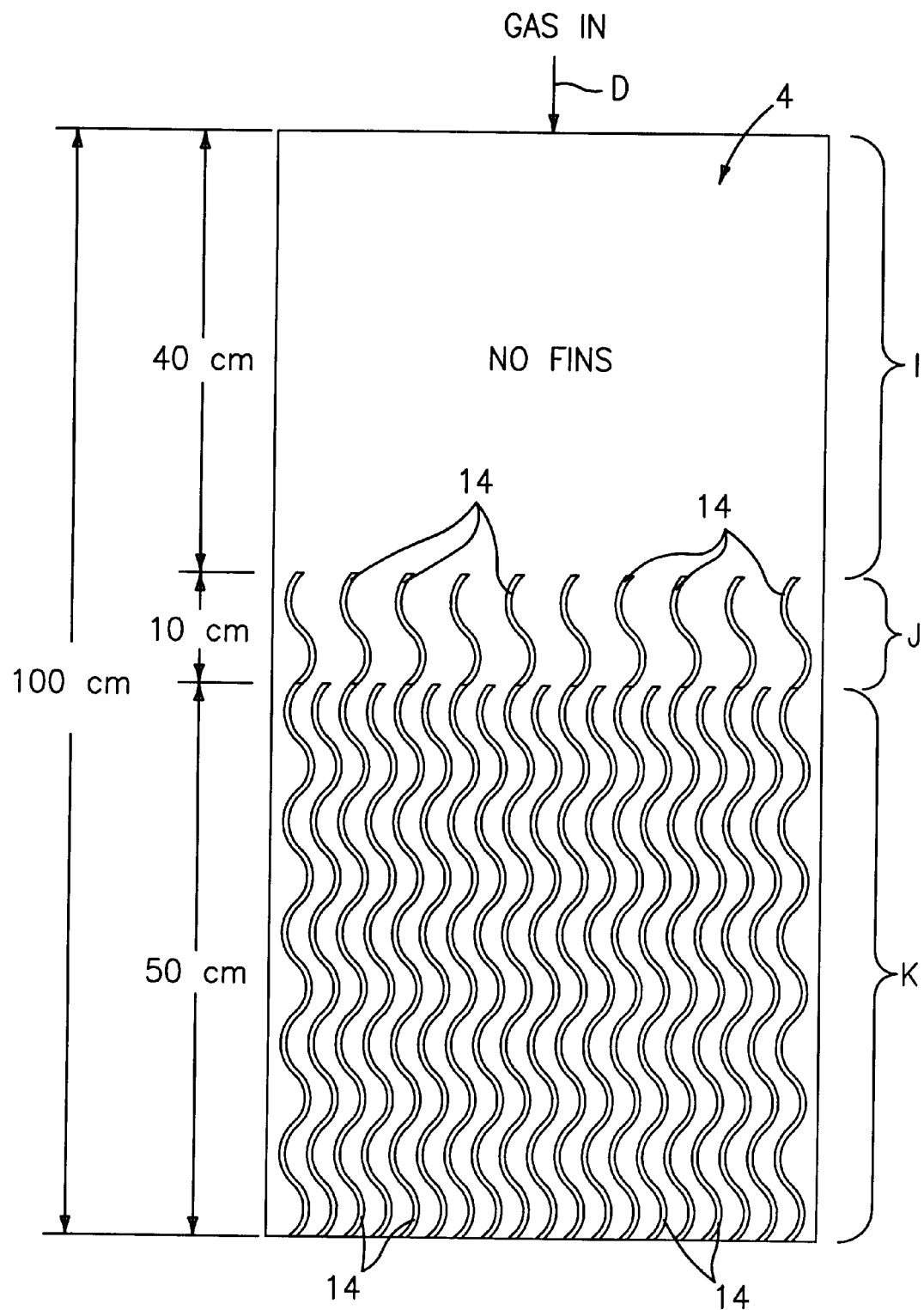
FIG. 3 is a side elevational view of one of the burner gas passages, with a side wall removed, so as to expose one particular varied heat transfer fin population density arrangement that will produce a heat transfer profile which provides the proper reformer gas reaction temperatures, while limiting the burner passage wall temperatures to acceptable maximums.

FIG. 3 is a side elevational view of one of the burner gas passages 4 which are used in the reformer modules formed in accordance with this invention. The direction of burner gas flow is indicated in FIG. 3 by the arrow D, as in FIG. 1. The initial section of the burner gas flow passage 4, which is denoted by the letter I, is devoid of heat transfer fins. A subsequent medial section J of the burner gas flow passage 4 is provided with a limited population density of heat transfer fins 14 that will produce a limited amount of heat transfer from the burner gases to the burner gas flow passage walls. The final section K of the burner gas flow passage 4 is provided with a greater population density of the heat transfer fins 14 that will produce a greater amount of heat transfer from the burner gases to the burner gas flow passage walls. The lack of heat transfer fins in the initial section I of the burner gas flow passages results in minimal heat transfer from the burner gases to the walls of the burner gas passages 4 in the initial section 1. The use of the graduated heat transfer fin population density in the several sections results in the necessary gas temperatures, and lowers the burner gas passage wall temperatures to acceptable limits.

One specific heat transfer fin deployment and population density scheme as shown in FIG. 3 is as follows. The length of the gas passages in the reformer shown in the drawings is one hundred centimeters. The first forty centimeters I of the burner gas passages is devoid of heat transfer fins. The next ten centimeters J of the burner gas passages has the low population density distribution of heat transfer fins 14, which in one embodiment of the invention is about one fin per inch. The final fifty centimeters K of the burner gas passages has a high population density distribution of heat transfer fins 14, which in this embodiment of the invention is about ten fins per inch. Thus, in the specific embodiment shown in FIG. 3, 40% of the inlet part of the burner gas passages is devoid of heat transfer fins; the following 10% of the burner gas passages has a low population density distribution of heat transfer fins; and the final 50% of the burner gas passages has a higher population density distribution the heat transfer fins.

Figure 4:
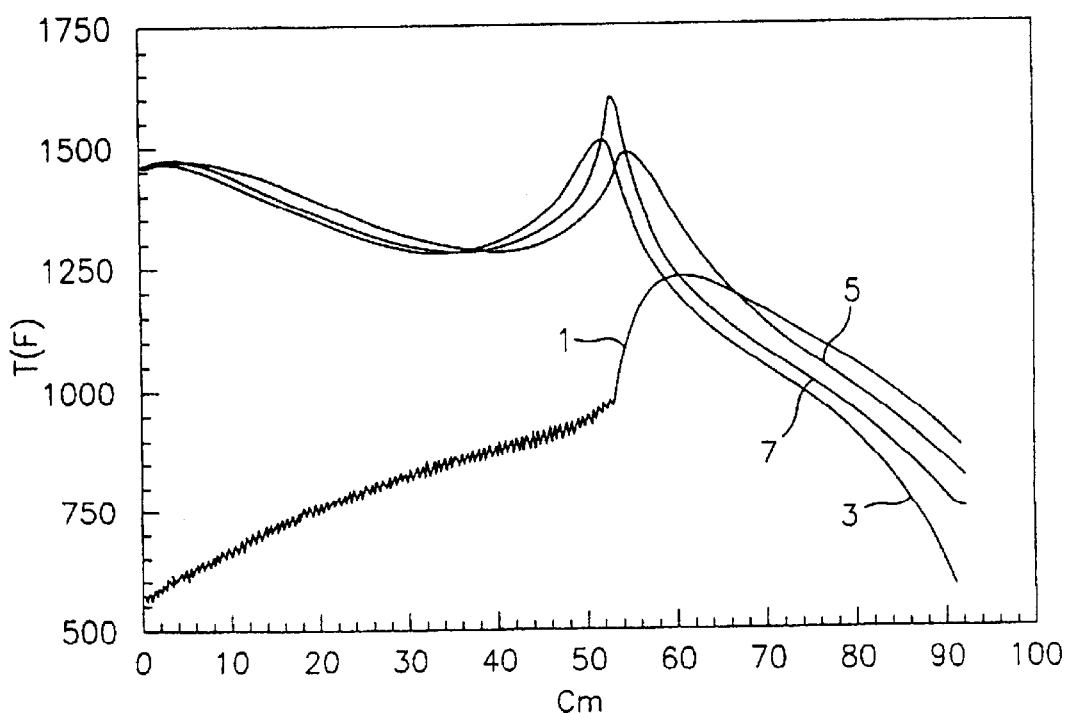
FIG. 4 is a temperature profile similar to FIG. 2, but showing the temperature profile of a reformer assembly which is equipped with the version of the modified heat transfer fin structure of this invention shown in FIG. 3.

FIG. 4 is a plot of the temperatures of various components in the reformer assembly, the Y axis being degrees Fahrenheit, and the X axis being the distance in centimeters from the entrance of the burner gas passages to the exit of the burner gas passages when the structure shown in FIG. 3 is used to reform a fuel gas stream and the burner gas flow and fuel gas flow are counter to each other. As with FIG. 2, the trace 1 is a trace of the temperature of the burner gases; trace 3 is a trace of the temperature of the reformer gases; trace 5 is a trace of the temperature of the regenerator gases; and trace 7 is a trace of the temperature of the walls of the burner gas passages. All of the temperatures achieved by the reformer structure shown in FIG. 3 are acceptable. Thus, the reformer structure which includes the varied heat transfer fin population density distribution shown in FIG. 3 results in acceptable burner gas passage wall temperatures which max out at about 1,600° F. Burner gas passage wall temperatures of this magnitude will not drastically shorten the useful life of the reformer, and will not melt the walls of the burner passages during prolonged periods of use. It is noted that when a varied heat transfer fin population distribution density scheme is utilized, as shown in FIG. 3, the peak temperature 7 of the burner gas walls does not significantly exceed the peak temperature of the reformer and regenerator gas streams 3 and 5 respectively. In order to provide extended operating life, the peak burner gas passage wall temperatures should be kept below about 1,700° F. The difference between the peak burner wall temperature and the peak process gas temperature should be kept as small as possible.

It will be readily appreciated that the improved heat transfer fin population density distribution results allows usage of the desirable burner gas-process gas counter flow approach in the reformer without encountering excessively high burner wall temperatures. The fin population density distribution also results in keeping the peak burner wall temperature and the peak process gas stream temperature relatively close to each other so as to enhance the efficiency of the reformer. By increasing the heat transfer from the burner passages to the process gas passages at the inlet ends of the process gas passages, the assembly takes advantage of the high heat absorption capabilities of the incoming process gas stream.

Since many changes and variations of the disclosed embodiment of the invention may be made without departing from the inventive concept, it is not intended to limit the invention other than as required by the appended claims.

What is claimed is:

1. A hydrocarbon fuel gas steam reformer assemblage comprising:
   a) at least one process gas passage, said process gas passage having an inlet end and an outlet end, said process gas passage being operable to direct a stream of a fuel gas and steam mixture through said assemblage in a first direction;
   b) at least one burner gas passage disposed in heat transfer relationship with said process gas passage, said burner gas passage having an inlet end and an outlet end, and said burner gas passage being operable to direct a stream of a burner gas through said assemblage in a second direction which is counter to said first direction; and
   c) a plurality of heat transfer fins disposed in said burner gas passage, said heat transfer fins being present in a population density gradient from said burner gas passage inlet end to said burner gas passage outlet end, said fin population density gradient providing minimal heat transfer to walls of said burner gas passage in an inlet section of said burner gas passage; and said fin population density gradient providing increased heat transfer to said walls of said burner gas passage in an intermediate section of said burner gas passage; and said fin population density gradient providing still greater heat transfer to said walls of said burner gas passage in an outlet section of said burner gas passage.

2. The reformer assemblage of claim 1 wherein said heat transfer fin population density gradient is operable to maintain a peak burner gas passage wall temperature of no greater than about 1,700° F.

3. The reformer assemblage of claim 1 wherein said heat transfer fin population density gradient is operable to maintain a peak burner gas passage wall temperature which is no greater than about 100° F. above a peak process gas temperature in the assemblage.

4. The reformer assemblage of claim 1 wherein said inlet section of said burner gas passage is devoid of heat transfer fins.

5. The reformer assemblage of claim 4 wherein said intermediate section of said burner gas passage includes a first predetermined number of heat transfer fins.

6. The reformer assemblage of claim 5 wherein said outlet section of said burner gas passage includes a second predetermined number of heat transfer fins which is greater than said first predetermined number.

7. The reformer assemblage of claim 1 wherein said inlet section of said burner gas passage is about 40% of the length of said burner gas passage.

8. The reformer assemblage of claim 7 wherein said intermediate section of said burner gas passage is about 10% of the length of said burner gas passage.

9. The reformer assemblage of claim 8 wherein said outlet section of said burner gas passage is about 50% of the length of said burner gas passage.

10. A hydrocarbon fuel gas steam reformer assemblage comprising:
    a) at least one process gas passage, said process gas passage having an inlet end and an outlet end, said process gas passage being operable to direct a stream of a fuel gas and steam mixture through said assemblage;
    b) at least one burner gas passage disposed in heat transfer relationship with said process gas passage, said burner gas passage having an inlet end and an outlet end, and said burner gas passage being operable to direct a stream of a burner gas through said assemblage in a direction which is counter to said fuel gas and steam mixture stream flow; and
    c) a plurality of heat transfer fins disposed in said burner gas passage, said heat transfer fins being present in a fin population density gradient which increases from said burner gas passage inlet end to said burner gas passage outlet end, said fin population density gradient providing a first heat transfer capacity from the burner gas to walls of said burner gas passage in an inlet section of said burner gas passage; and said fin population density gradient providing a second heat transfer capacity from said burner gas to said walls of said burner gas passage in an intermediate section of said burner gas passage; and said fin population density gradient providing a third heat transfer capacity from said burner gas to said walls of said burner gas passage in an outlet section of said burner gas passage, said third heat transfer capacity being greater than said second heat transfer capacity, and said second heat transfer capacity being greater than said first heat transfer capacity.

11. The reformer assemblage of claim 10 wherein said inlet section of said burner gas passage is devoid of heat transfer fins and constitutes about 40% of the distance between said burner gas passage inlet end and said burner gas passage outlet end.

12. The reformer assemblage of claim 11 wherein said intermediate section of said burner gas passage has a first heat transfer fin population density and constitutes about 10% of the distance between said burner gas passage inlet end and said burner gas passage outlet end.

13. The reformer assemblage of claim 12 wherein said outlet section of said burner gas passage has a second heat transfer fin-population density which is greater than said first heat transfer fin population density and constitutes about 50% of the distance between said burner gas passage inlet end and said burner gas passage outlet end.

14. The reformer assemblage of claim 13 wherein the heat transfer fin population density in said outlet section of said burner gas passage is about twice the heat transfer fin population density in said intermediate section of said burner gas passage.

* * * * *